(12) United States Patent
Bodin et al.

(10) Patent No.: US 7,296,499 B2
(45) Date of Patent: Nov. 20, 2007

(54) MUSHROOMING EXPANDABLE ANCHOR INSTALLATION TOOL

(75) Inventors: Richard G. Bodin, Saint Paul, MN (US); Norbert K. Kolodziej, Park Ridge, IL (US)

(73) Assignee: Illinoise Tool Works, Inc., Glenview, IL (US)

( * ) Notice: Subject to any disclaimer, the term of this patent is extended or adjusted under 35 U.S.C. 154(b) by 0 days.

(21) Appl. No.: 11/084,880

(22) Filed: Mar. 21, 2005

(65) Prior Publication Data

US 2005/0163585 A1    Jul. 28, 2005

Related U.S. Application Data

(62) Division of application No. 10/213,795, filed on Aug. 7, 2002, now Pat. No. 6,935,821.

(60) Provisional application No. 60/370,487, filed on Apr. 5, 2002.

(51) Int. Cl.
*B25B 13/48* (2006.01)
*B25B 9/00* (2006.01)
*B25B 23/08* (2006.01)

(52) U.S. Cl. ............... 81/55; 81/13; 81/451; 81/124.5

(58) Field of Classification Search ............... 81/54, 81/55, 13, 124.5, 451, 121.1
See application file for complete search history.

(56) References Cited

U.S. PATENT DOCUMENTS

| | | | |
|---|---|---|---|
| 1,389,468 A * | 8/1921 | White | 81/55 |
| 2,405,462 A * | 8/1946 | Stair | 81/124.7 |
| 3,739,825 A * | 6/1973 | Knox | 81/451 |
| 3,750,518 A | 8/1973 | Rayburn | |
| 4,836,062 A * | 6/1989 | LaTorre | 81/55 |
| 5,518,351 A | 5/1996 | Peil | |
| 5,618,142 A | 4/1997 | Sonden et al. | |
| 5,755,542 A | 5/1998 | Janusz et al. | |
| 6,122,816 A | 9/2000 | Ladouceur | |
| 6,868,757 B2 * | 3/2005 | Hufnagl et al. | 81/55 |

FOREIGN PATENT DOCUMENTS

EP    0 647 294 B1    12/1996

OTHER PUBLICATIONS

Speedy Products, Inc., Sammy Super Screw Specialty Industrial Fasteners, Sep. 19, 2001, homepage (2pp.) at www.sammysuperscrew.com.
Speedy Products, Inc., Sammy Super Screw, Sep. 19, 2001, products page (2pp.) at www.sammysuperscrew.com.
AVK Industrial Products, The AVK A-R Page, Sep. 20, 2001, product page at www.avkfasteners.com.
AVK Industrial Products, A-R Product Page with Installation Sequence at www.avkfasteners.com.

* cited by examiner

*Primary Examiner*—Hadi Shakeri
(74) *Attorney, Agent, or Firm*—Steven E. Kahm; Nikolai & Mersereau, P.A.

(57) ABSTRACT

The installation tool for a mushrooming expandable anchor has a hollow cylindrical sleeve with an inside diameter, the top having slots for engaging the base of the mushrooming component and a means for engaging and turning a threaded component, which compresses the mushrooming component. The means for turning the threaded component can be a socket, which rotates inside of the sleeve and engages a hex head at the base of the threaded component or alternatively the means for turning the threaded component can be a threaded rod for threading into the base of the threaded component until it reaches the end of the threads in the base. Another means of turning the threaded component is a screwdriver engaging a slot in the treaded component. All of the means for turning the treaded component may be by a powered drill with a connective adapter.

4 Claims, 5 Drawing Sheets

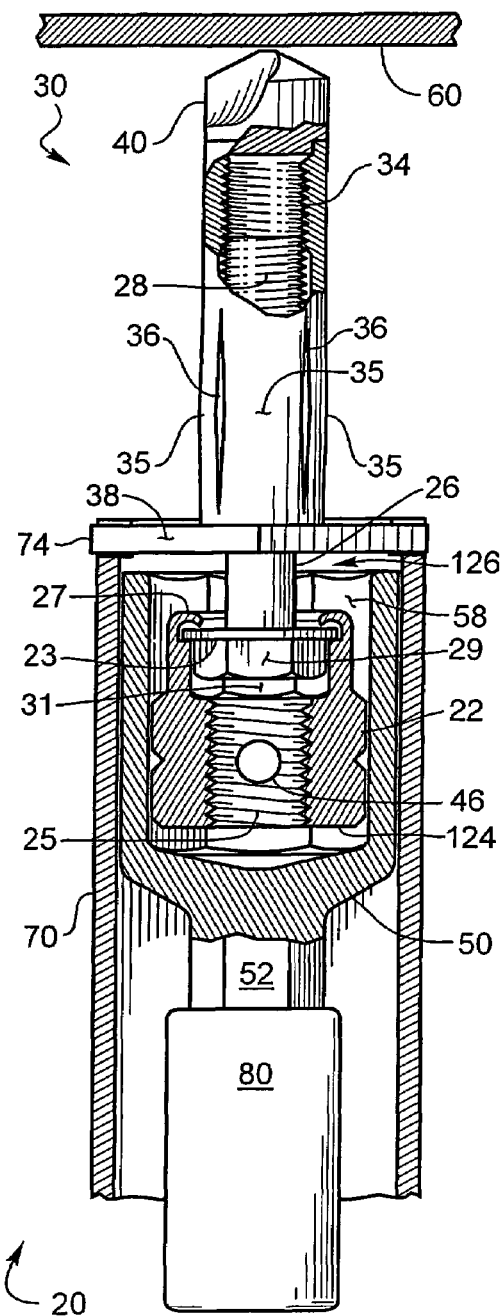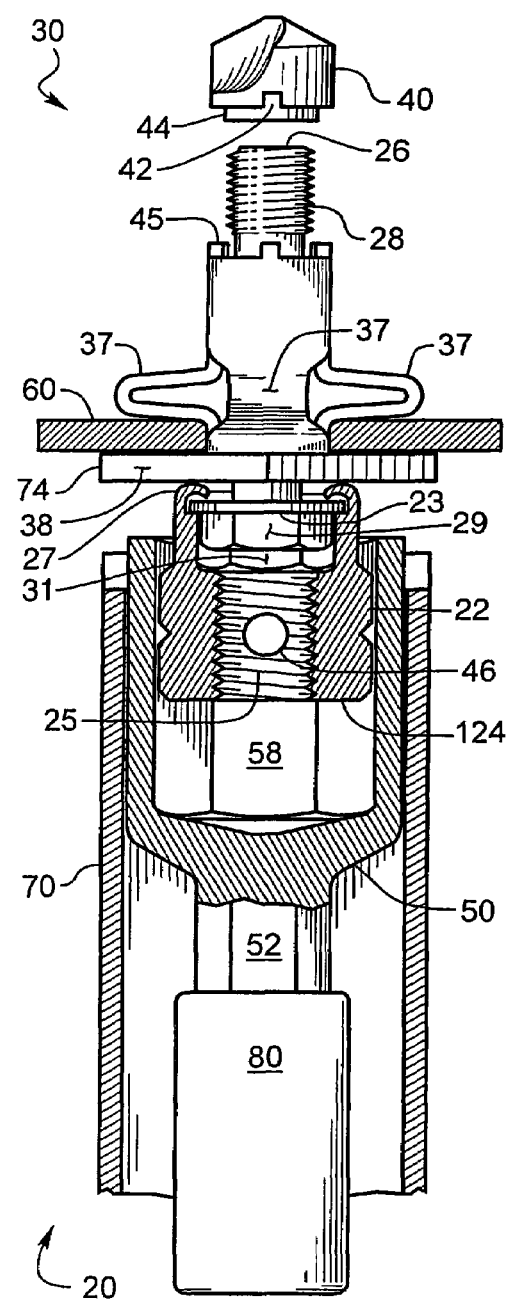
*Fig. 2*  *Fig. 3*

MUSHROOMING EXPANDABLE ANCHOR INSTALLATION TOOL

This application is a divisional application of Ser. No. 10/213,795 filed Aug. 7, 2002 now U.S. Pat. No. 6,935,821 granted Aug. 30, 2005.

BACKGROUND OF THE INVENTION

1. Field of the Invention

This invention relates toan installation tool for self-expanding fasteners, having an outer sleeve for preventing the mushrooming component from turning and a socket for turning a threaded component said socket turning inside of the outer sleeve.

2. Description of the Related Art

Plumbers, electricians, mechanical contractors, sprinkler fitters and maintenance personnel often have to hang pipe, conduit, cabling, ducting, light fixtures and various other items from structural supports such as ceilings, thin metal decking, roof decking, beams, Z purlin, bar joist or other truss materials.

Specialty brackets must be employed or holes must be be drilled in the material and a mounting plate or bracket bolted in place with nuts, bolts, or screws to support a hanger therefrom. Often times access to the top or backside of the material may be restricted making use of backing nuts difficult or impossible to incorporate. These methods either use multiple installation steps with several parts being installed separately, or have limitations on the ease of installation and involve parts, which can be stripped, over torqued or otherwise compromised during or after installation.

Additionally, the space required by various mechanical systems incorporated in most buildings hinders and often prohibits the worker from easily reaching the support from which the hanger is to be attached. This space limitation combined with multi-step processes for attaching the hanger such as drilling a hole, placing a back nut over the hole and turning in a bolt while balancing on a ladder is difficult, time consuming, dangerous and expensive.

Further the strength and integrity of the fastening connection must be calibrated and known for building inspection and end product integrity. Some methods used cannot guarantee the strength of the connection, due to base material limitations, thickness of the various building materials employed in today's building practices and installer error.

SUMMARY OF THE INVENTION

The mushrooming expandable anchor has two main components, the portion that collapses or mushrooms and a second threaded component that mechanically causes the collapse.

The mushrooming component has a tubular body with a short section of internal threads on one end and a square flat washer on the opposite end. The tubular portion of the mushrooming component has slits in the sides, and the sides are slightly bowed out to promote symmetrical collapse. The tube is collapsed by a treaded screw rotated within the tubular body pulling the internally threaded section downwards towards the washer at the base. The mushrooming anchor when collapsed has radially extended anchoring strips preventing extraction of the fastener from a hole drilled in the support through which the fastener extends.

When there is clear access to the fastening point and the installer is on a lift or other support, the installer can first drill a hole through the support. The expandable anchor is then inserted into the hole and the internal threaded component is rotated collapsing the tubular body portion of the fastener.

In another embodiment a drill point can be pressed into the tip of the expandable anchor for self-drilling through the support.

The anchor is easy to use by simply placing the device in a socket attached to a drill and turning the socket. The drill point on the end of the expandable anchor drills a hole in the support it is to be held from. Once the hole is drilled, the anchor seats into the hole and an external socket end sleeve tool slides upward over the internal socket engaging the seated, unexpanded fastener. The exterior sleeve engages the square seated collar of the fastener preventing it from rotating. The interior socket is then rotated causing the expanding portion of the fastener to collapse as the point of the internal threaded portion pushes the pressed in drill point from the anchor. This self-drilling option allows the installer to fasten and hang threaded rod from the floor. Any given length of threaded rod can be installed into high ceilings with the limitations being (1) the length of the pole tool, which can be a telescoping tool comprised of aluminum tubes as are readily available in the market place and (2) the length of the threaded rod because the threaded rod must protrude from the lower end of the pole tool so it can be rotated within the pole tool independently. By rotating the threaded rod with the self-drilling fastener already threaded onto its end, the fastener self drills and seats itself. Once seated, the extended pole tool (with the rod inside) is lifted and the notched exterior pole tool end engages the base of the expandable portion of the fastener prohibiting it from rotating. The next step is to turn the threaded rod causing the mushrooming portion of the fastener to collapse. The threaded rod remains installed in the fastener, allowing the worker to hang the intended load.

Alternatively the self-drilling expandable anchor can be constructed in a different manner. In this embodiment the collapsible mushrooming portion with a drill point can be placed in the inner socket and rotated by a drill to drill a hole in the support and seat the collapsible mushrooming portion that has a receiver head broached directly onto the opposite end of the drill point. A threaded component is incorporated within the assembly and collapses it by use of an internal screwdriver. The drill point is pushed from the top of the mushrooming portion by the advancing threaded component.

In another embodiment a drill bit having a hex at it's base is placed in a drill to drill a hole in a support. Once the hole is drilled a combination sleeve tool is placed over the drill bit and engages the hex at the drill bit base. The outer portion of the combination sleeve tool engages the collapsible mushrooming portion to keep it from turning and the threaded component of the expandable anchor is engaged by an internal drive/drive shaft. The expandable anchor is inserted into the drilled hole in the support and the internal threaded component is turned relative to the collapsible mushrooming portion to collapse it by operating the drill.

Once the expandable anchor has been installed in the support an all thread rod may then be installed into the male receiver at the base of the threaded component. The hanger is now ready for its intended load. Alternatively a cross drilled head in the base of the threaded component could hang wire or an adaptor bracket to allow the fastening of rods, bracing, bracketing or wire. The expandable anchor can have a fixed head or a swivel head.

The expandable anchor provides a known pull out strength which is necessary for building safety while providing an easy to install method having a fool proof, no stripping, overturning or over torquing feature thus preventing breakage of the fastener which may cause failure and increase construction costs.

OBJECTS OF THE INVENTION

It is an object of the invention to provide a self expanding anchor hanger.

It is an object of the invention to provide a fastener with exceptionally high pull out strength when used in very thin metals.

It is an object of the invention to provide a hanger with a swivel head.

It is an object of the invention to provide a hanger, which is easy to install.

It is an object of the invention to insure proper consistent, installation.

It is an object of the invention to provide easy access to a support point for easy installation of the hanger in confined spaces.

It is an object of the invention to provide a one-piece fastener.

It is an object of the invention to provide a hanger, which is quickly installed.

It is an object of the invention to use the invention with a predrilled hole in a support.

It is an object of the invention to provide a means for self drilling a hole in the support.

It is an object of the invention to install a fastener and threaded rod as one unit for hanging objects from.

It is an object of the invention to install threaded rod without the use of ladders or scaffolding.

Other objects, advantages and novel features of the present invention will become apparent from the following description of the preferred embodiments when considered in conjunction with the accompanying drawings.

BRIEF DESCRIPTION OF THE DRAWINGS

FIG. 2 is a cut-a-way expanded side view of the expandable anchor with drill tip installed and a socket, drive shaft extension and sleeve tool before installation of the mushrooming expandable anchor.

FIG. 3 is a cut-a-way expanded side view of the expandable anchor with drill tip installed and a socket, drive shaft extension and sleeve tool after installation of the mushrooming expandable anchor.

DESCRIPTION OF THE PREFERRED EMBODIMENTS

Figure 1:
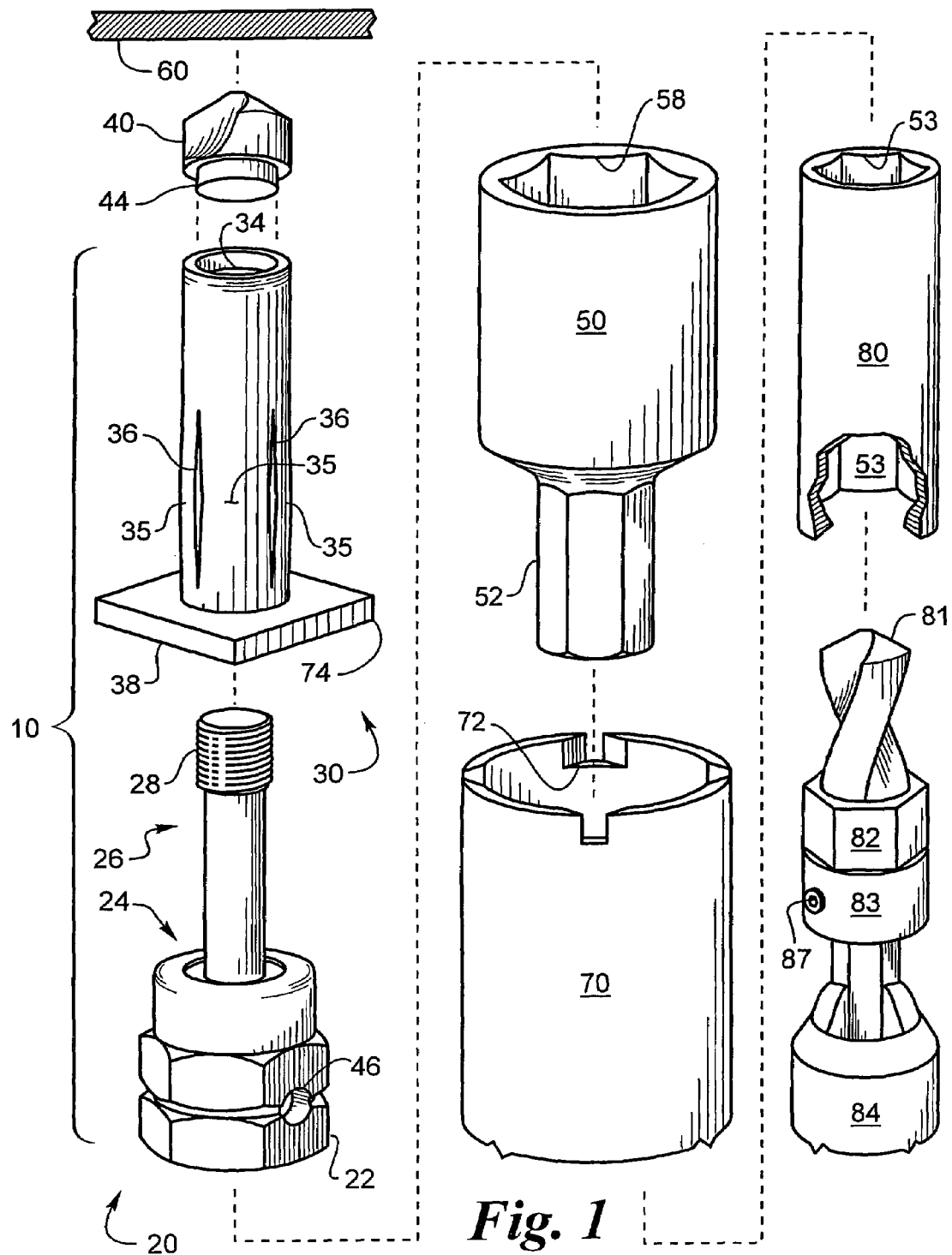
FIG. 1 is an exploded perspective view of the drill point, collapsible mushrooming portion, threaded component with an attached nut head, and the associated sockets, sleeve tools and socket extensions for operating the expandable anchor.

FIG. 1 shows the self-drilling screw with expandable anchor 10 unassembled. In a first embodiment the self-drilling screw having an expandable anchor 10 has three component parts. A hex head screw threaded component 20 similar to a SAMMY SUPER SCREW® sold by Speedy Products, Inc. owned by Illinois Tool Works, Inc. 3600 West Lake Avenue, Glenview, Ill. 60025-5811, a mushrooming component 30 similar to AVK Industrial Products A-R Series™ Threaded Insert, sold by AVK Industrial Products of Valencia, Calif. and a drill point 40. FIG. 1 also shows tools used to install the mushrooming expandable anchor 10. The tools include a socket 50 for turning the hex head screw 20, a sleeve tool 70 for engaging the expandable anchor 30, an internally broached drive shaft 80 for engaging the socket 50, a drive tool/adaptor 83 having a hex adaptor portion 82 to turn the above described assembly and adapt to drill bit 81, if a drill point 40 is not included in the assembly, and finally drill 84.

In a first embodiment, as shown in FIG. 1, the drill point 40 has a slightly larger diameter than the mushrooming component 30 such that it can cut a hole in a support 60 and allow the mushrooming portion 35 of the expandable anchor body 30 to fit though the drilled hole.

Figure 7:
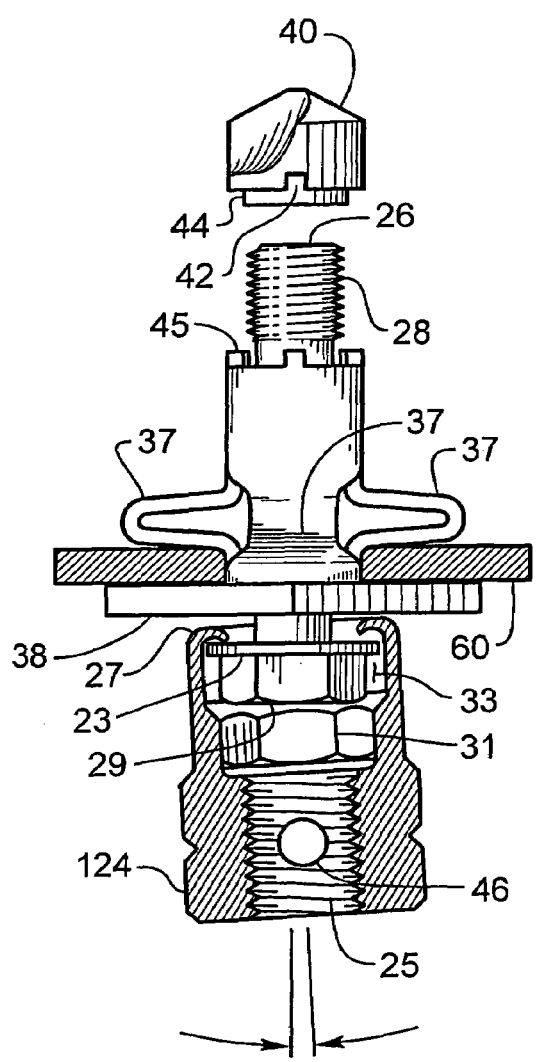
FIG. 7 is a cut-a-way side view of a second embodiment of the expandable anchor installed, wherein the anchor has a swivel head and a post and slot drill tip.
Figure 8:
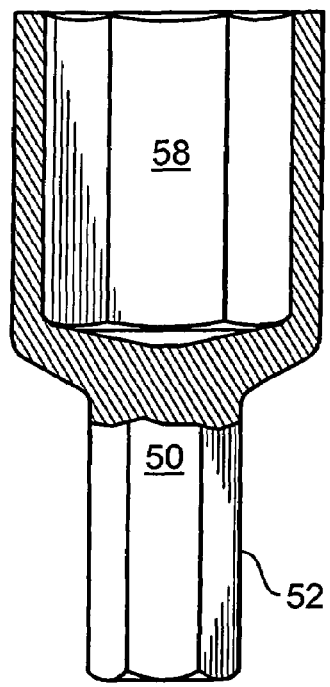
FIG. 8 is a cut-a-way side view of a socket for use with the screw having an expandable anchor.

The mushrooming component 30 is basically a cylinder having an internal threaded portion 34 near the top and a base 38 at the bottom. Slots 36 are cut thought the cylinder walls in several locations around the mushrooming component 30 so that it can be compressed and split apart along the slits to form anchoring strips 37 when the mushrooming component 30 is collapsed as shown in FIGS. 3 and 7. The mushrooming component 30 is formed with a bulge in the walls to facilitate the collapse of anchoring strips 37. Although mushrooming component 30 is shown as a cylindrical body with a circular cross section in the figures it can be any shape with any cross section such as an octagon, hexagon, square, or oval etc. as long as it will fit through the hole drilled in the support and collapse as shown herein.

The hex head component 20 has a hex head portion 22, a base portion 24 and a screw shaft 26 having a diameter just smaller than the inside threaded diameter 34 of the mushrooming component 30. The shaft 26 has a threaded section 28 on the top portion for engaging the threads of the internal threaded portion 34 in the mushrooming component 30.

In one mode of use, as seen in FIGS. 2 and 3, the threads of the internal threaded portion 34 in mushrooming component 30 are threaded onto the threads 28 on the screw shaft 26 of hex head screw 20 by a few turns. The hex head screw 20 is placed in a socket 50 having a hexagon wall 58 on a portion of the inside surface for mating with the hex head portion 22 of hex head screw 20. The hex head screw 20 can then be turned by the socket 50.

Figure 10:
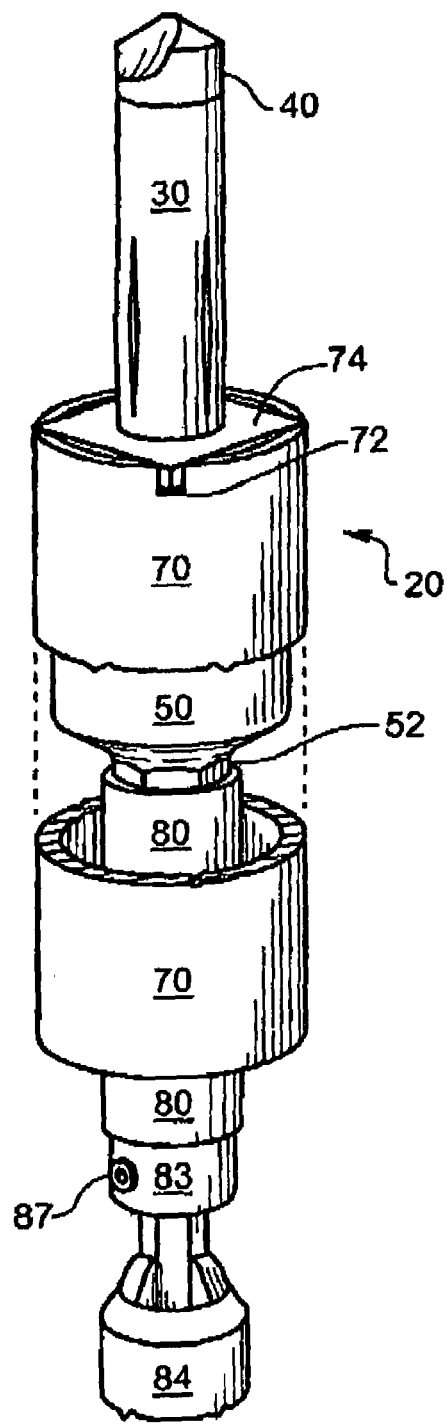
FIG. 10 is a perspective view of a drill, drill bit, sleeve tool, socket, extension pole tool, the collapsible mushroom portion, the threaded component, and a mushrooming expandable anchor with a drill point.

As best seen in FIG. 10 a sleeve tool 70 has an inside diameter which fits over the outside diameter of the socket 50 such that the socket 50 can rotate inside the sleeve tool.

70 when desired. The sleeve tool 70 has notches 72 for engaging the corners 74 of the base 38 of the mushrooming component 30. Sleeve tool 70 can either be a hand held tool on the order of 12 to 15 inches long or an expandable pole tool that can be extended to any length. The sleeve tool 70 may have a hand gripping means to hold it in place while the socket 50 is being turned therein.

The socket 50 has a hex shaft 52 for connection to internally broached drive shaft 80 which allows connection to drive tool/adaptor 83 having a hex adapter portion 82, as seen in FIG. 1. A driving means 84 such as an electric or battery operated drill, air powered drill or the like can rotate the assembly.

The driving means 84 is connected to the drive shaft 80 to drive socket 50 by part 83, which optionally holds disposable drill bit 81.

As seen in FIG. 2 the driving means 84 will turn drill point 40 on the top of mushrooming component 30 to cut through a support 60, which may be a thin metal decking, beams, supports, Z purlin, bar joist, roof decking, or other truss materials. After the drill point 40 has cut through the support 60 the drill point 40 is no longer needed.

The next step in the process is to collapse or mushroom the mushrooming component 30, as seen in FIG. 3 to secure it from being pulled out of the support 60. The driving means 84 will now rotate the combination of socket 50 and drive shaft 80 while the installer is holding the sleeve tool 70 in a fixed position such that the hex head screw 20 can rotate relative to the mushrooming component 30 thus rotating the treads 28 of the screw. As best seen in FIG. 1 the threads 28 are only on a portion of the top of the screw shaft 26. The internal threaded portion 34 of the mushrooming component 30 is also only on a top portion of the mushrooming component 30. The relative length of the threaded portions 28 and 34 on the screw shaft 26 and the mushrooming component 30 respectively are such that as the hex head screw 20 is turned relative to the mushrooming component 30 the top of the mushrooming component 30 will be pulled downward allowing the bowed portion 35 having the slots 36 to collapse, forming anchoring strips 37 as seen in FIGS. 3 and 7. Base 38 will be pulled up against the bottom of support 60 and will not fit through the drilled hole therein. As the hex head screw 20 is turned relative to the mushrooming component 30 the anchoring strips 37 will be flattened out. The anchoring strips 37 will not fit through the hole self-drilled by drill point 40 offering a pull out strength strong enough to support whatever the hanger is to be attached to. As shown in FIGS. 2, 3, 4, 7 and 9 the internal hanger threads 25 in the bottom portion of the hex head screw 20 are available to hold whatever is screwed into the hanger threads 25 or alternatively a cross drilled hole 46 may be incorporated to allow attachment of a great variety of adaptors. The pull out strength can vary depending on the support material 60.

As can be seen in FIG. 3 the drill point 40 is expelled from the top of the mushrooming component 30 by the top of the screw shaft 26 as it pushes through the top of the expandable anchor 10. The drill point 40 will then fall out and may land on the support 60.

The lengths of the threaded portions 28 and 34 on the screw shaft 26 and the mushrooming component 30 respectively are such that the threads 28 on the screw shaft 26 will exit the top threads of internal threaded portion 34 on the mushrooming component 30 allowing the hex head screw 20 to spin freely thereafter when the expandable anchor 10 is compressed to the desired amount. This spin free feature eliminates possible over torque or fracture of components incorporated in fastener 10.

Figure 5:
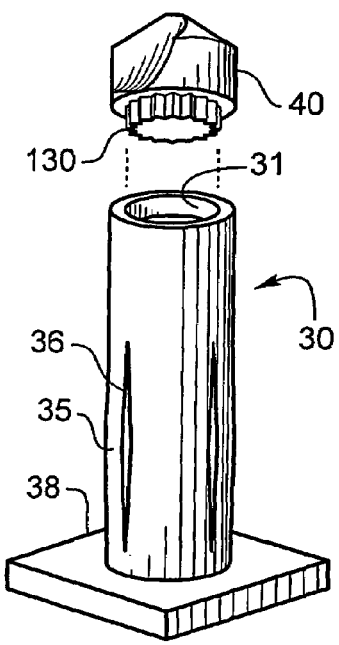
FIG. 5 is a perspective view of an embodiment of the mushrooming portion of the expandable anchor with teeth on the drill tip.
Figure 6:
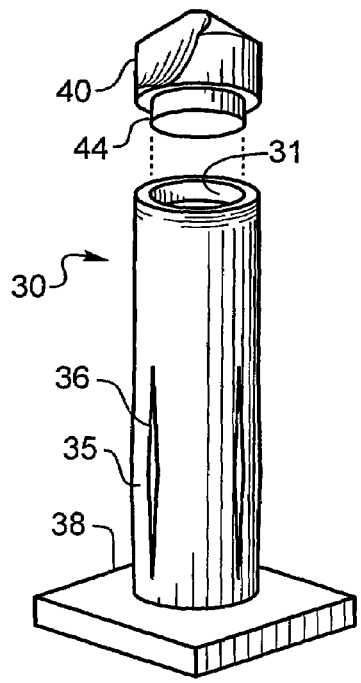
FIG. 6 is a perspective view of an embodiment of the mushrooming portion of the expandable anchor with a swaged drill tip.

It should be noted that the drill point 40 can be connected to the mushrooming component 30 in many different ways. In FIG. 6 the drill point 40 is swaged at neck 44 into the mushrooming component 30. In FIG. 5 the drill point 40 has teeth 130 for engaging the mushrooming component 30. In FIG. 3 the drill point 40 has teeth notches 42 for engaging posts 45 the mushrooming component 30.

When self-drilling a hole in the support 60 the socket 50 turns the hex head screw 20 while notches 72 in sleeve 70 engage the corners 74 of the base 38 on the mushrooming component 30. When the socket 50 turns the screw 20 the mushrooming component 30 and sleeve 70 will spin with the screw 20 since it takes a great deal of force to turn the threads 28 on screw 20 into the treads of internal threaded portion 34 of mushrooming component 30. Therefore the drilling can be accomplished without collapsing the mushrooming component 30. However when the sleeve 70 is held to keep it from rotating then the mushrooming component 30 will collapse. Alternatively the sleeve 70 will not be placed into engagement with the mushrooming component 30 and held from spinning until it is desired to collapse the mushrooming component 30.

There can be many different varieties of hex head screw 20. As shown in FIG. 1 the screw shaft 26 is integral with or fixed in the base 24. Alternatively as shown in FIGS. 2, 3, 4, and 7 the hex head screw 20 is an assembly of two parts, the base portion 124 with a hex head base 22 and a screw 126 having screw shaft 26 with threads 28, a screw hex head 29 having a rim 23. The hex head 29 on screw 126 mates with a hex head receiving portion 31 in the base portion 124 of hex head screw 20. The screw 126 with a hex head 29 can be a standard screw, which can be purchased in bulk at low prices from any number of suppliers. The base portion 124 can have the hex head receiving portion 31 for receiving the hex head 29 of screw 126 and then folding a flange 27 over the rim 23 to keep the screw 126 in place relative to the base portion 124. As shown in greater detail in the applicant's co pending application Ser. No. 09/848,658 filed May 4, 2001 titled MOUNTING APPARATUS HAVING A SWIVEL HEAD, now Pat. No. 6,443,680 issued Sep. 3, 2002, which is hereby made a part hereof and incorporated herein by reference, the flange 27 can be some distance from the hex head receiving portion 31 providing space 33 for a dome portion within the base portion 124, as shown in FIG. 7. The dome portion 33 allows the screw hex head 29 to broach into the hex head receiving portion 31 when it is desired to fix the screw in position while in use for compressing the expandable anchor 30 and thereafter to release the screw hex head 29 from the hex head receiving portion 31 so that it can swivel freely in the domed portion 33.

Figure 9:
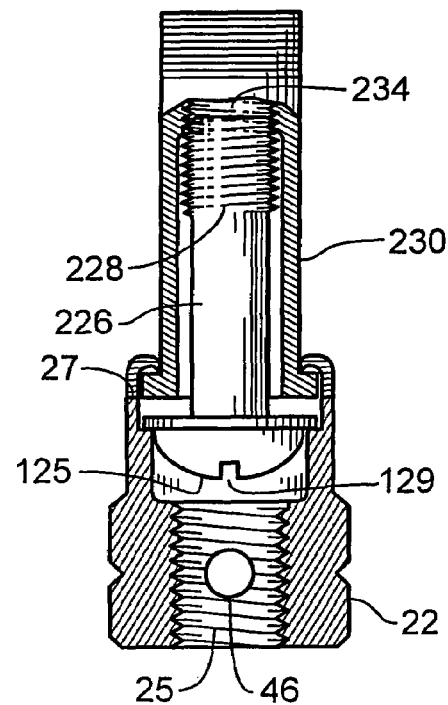
FIG. 9 is a cut-a-way side view of the mushrooming expandable anchor pressed permanently and swaged into a hex head with the interior screw turnable by a screwdriver or alternatively a square drive.

In an alternative embodiment, the self-drilling on pre drilling of the hole in the support 60 would proceed as in prior embodiments, however, instead of a screw hex head 29 the screw head would be replaced by an alternatively shaped head 125 with a slot or other such driver 129 therein as in FIG. 9. In this embodiment, the threads 228 of the screw shaft 226 can be turned relative to the threads 234 while the mushrooming component 230 is held stationary by a wrench while a screw driver, preferrably connected to a drill, is inserted in the slot 129 or some other means provided the screw head is designed to receive such a turning device. In this manner the mushrooming component 230 is collapsed. As shown in FIG. 9 mushrooming component 230 is internally broached into head 22 and held in place by flange 27.

As shown in FIG. 1 a disposable drill bit 81 fits into machine part 83 that has a hex adaptor portion 82 having a set screw 87. This fits into a drill chuck 84 to drill a hole in a support 60. In this embodiment the drill bit 40 is not used. After the hole is drilled a drive shaft 80 having interior hex portions 53 on both ends attaches to the hex portion 82 of the bit adaptor and hex portion 52 of socket 50 allowing the rotation of part 20 while sleeve 70 prevents rotation of mushrooming component 30. In this manner an installer can use the assembly repeatedly without rechucking his drill. He drills a hole in support material 60 with the drill bit 81 and then attaches the assembly as shown in FIGS. 1 and 10 by the assembly of parts 80, 50 and 70 over hex adaptor portion 82, to collapse mushrooming component 30 in the support 60. He then removes the assembly of parts 80, 50 and 70 to make the drill bit available for drilling the next hole in the support, then inserts another pre assembled non self-drilling screw with expandable anchor 10 in socket 50 and is ready to mushroom another collapsible component 30 in the support 60. Expandable anchor 10 is significantly less expensive without drill point 40 as a component.

Figure 4:
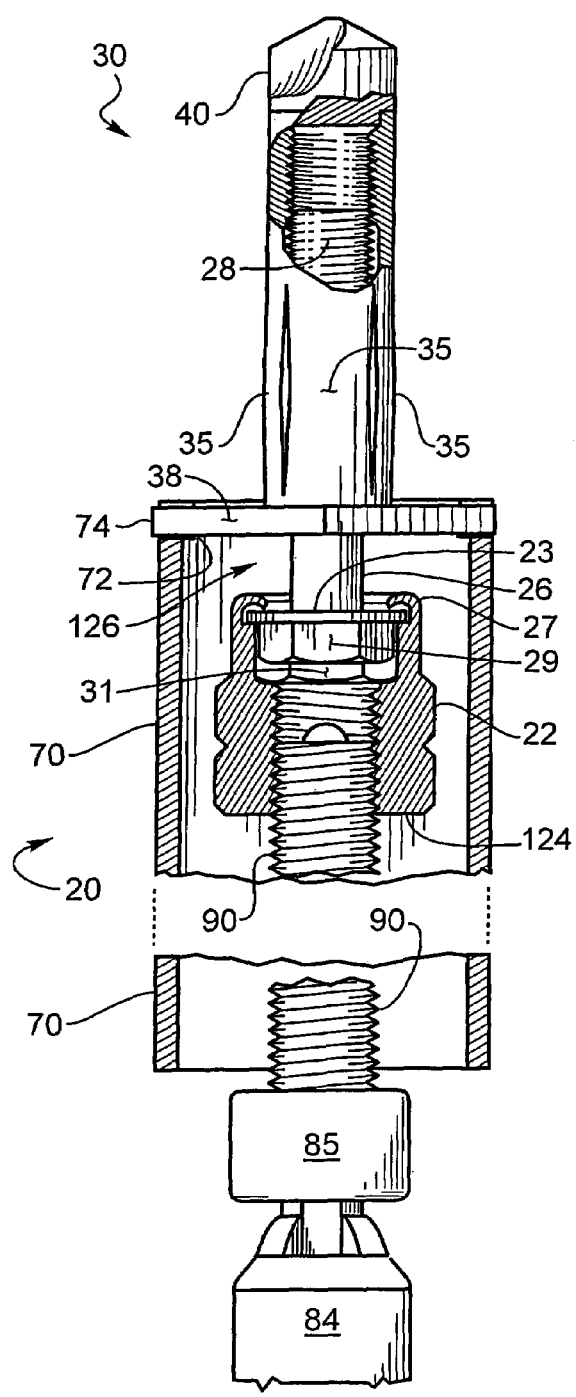
FIG. 4 is a cut-a-way expanded side view of a hand held drill, female all thread rod receiver, threaded rod with self drilling expandable mushrooming anchor attached inside a telescoping pole tool.

One of the advantages of the screw with expandable anchor 10 with a drill point 40 thereon is that it can be used with a pole installation method such that the installer need not be on a ladder adjacent the support 60 to drill a hole therein. He can stand on the floor and move about freely without having to reposition a ladder for each installation operation. With this method the installer can also access the support 60 through narrow gaps between pipes, vents or other equipment. The pole and equipment attached thereto can be held at a position considerably below the support 60 for self-drilling a hole therein and collapsing the collapsible anchor 10. To use this method a threaded rod 90 as seen in FIG. 4 can be threaded to the base of self-drilling hex head screw 20 using threads 25 therein. A long or an extendable pole tool 70 can be used with the threaded rod to match the length of the threaded rod. As shown in FIG. 4 drill chuck 84 receives internally threaded driver 85, which accepts a length of threaded rod 90. Threaded rod 90 must protrude from the lower end of pole tool 70. By rotating the assembly comprising the drill chuck 84, the driver 85 the threaded rod 90, part 10 and the drill point 40 will self drill through material 60. Once drilling is complete, pole tool 70 is raised to engage the corners 74 on base 38 of seated collapsible anchor portion 30. The installer grasps pole tool 70 preventing it from rotating while activating drill 84 thus turning threaded rod 90 and internal screw 20 causing collapse of mushrooming component 30. Then pole tool 70 is slid down leaving the complete fastener assembly 10 with threaded rod 90 ready for the intended load to be attached.

The pole tool 70 can be extendable to be used with different lengths of rods 90.

Alternatively if the installer would prefer to use an embodiment with no drill tip 40 on the mushrooming component 30 he would have to first drill a hole in the support 60 with a drill 84 and the assembly comprising disposable drill bit 81, and adaptor 83, and then install the collapsible anchor 10 as described above.

As shown in the figures the base of the screw 20 has internal threads 25 providing a connection to the object to be hung therefrom, however the base of screw 20 may use any means of attaching an object thereto.

In an alternate embodiment a hole 46 cross drilled through the hex head portion 22 can be used to insert a rod or bolt (not shown) for hanging an object or bracket by use of the hole 46.

Obviously, many modifications and variations of the present invention are possible in light of the above teachings. It is therefore to be understood that, within the scope of the appended claims, the invention may be practiced otherwise than as specifically described.

What is claimed is:

1. An installation tool for use with a threaded component and a mushrooming component of a mushrooming expandable anchor comprising:
    a sleeve having a cylindrical body with a hollow inside diameter portion and slots on the top for engaging the mushrooming component to prevent rotation of the mushrooming component,
    a means for engaging and rotating the threaded component which passes though the hollow inside diameter portion of the sleeve, the means for engaging and rotating the threaded component having a hex head shaft at its base,
    a drive shaft for engaging and turning the hex head shaft on the base of the means for engaging and rotating the threaded component,
    an adaptor to connect a drill to the drive shaft for providing power to turn the threaded component relative to the mushrooming component and collapse the mushrooming component,
    a drill bit on the adaptor for drilling holes.

2. An installation tool for use with a threaded component and a mushrooming component of a mushrooming expandable anchor as in claim 1 wherein:
    the threaded component has a hex head base,
    a socket comprises the means for engaging and rotating the threaded component hex head base.

3. An installation tool for use with a threaded component and a mushrooming component of a mushrooming expandable anchor as in claim 1 wherein:
    the threaded component has a threaded base,
    a threaded rod comprises the means for engaging and rotating the threaded component threaded base.

4. An installation tool for use with a threaded component and a mushrooming component of a mushrooming expandable anchor as in claim 1 wherein:
    the threaded component has a kerf at the end of the base,
    a screw driver comprises the means for engaging and rotating the kerf in the threaded component.

* * * * *

UNITED STATES PATENT AND TRADEMARK OFFICE
CERTIFICATE OF CORRECTION

PATENT NO. : 7,296,499 B2  Page 1 of 1
APPLICATION NO. : 11/084880
DATED : November 20, 2007
INVENTOR(S) : Richard G. Bodin and Norbert K. Kolodziej It is certified that error appears in the above-identified patent and that said Letters Patent is hereby corrected as shown below:

On the Title Page
Under (73) Assignee, please delete "Illinoise" and insert --Illinois--.

Signed and Sealed this

Twenty Second Day of April, 2008

JON W. DUDAS
*Director of the United States Patent and Trademark Office*